United States Patent Office 3,217,030
Patented Nov. 9, 1965

3,217,030
PURIFICATION OF DIESTER OF
TEREPHTHALIC ACID
Emil F. Jason and Ellis K. Fields, Chicago, Ill., assignors to Standard Oil Company, Chicago, Ill., a corporation of Indiana
No Drawing. Filed Feb. 19, 1962, Ser. No. 174,299
6 Claims. (Cl. 260—475)

This invention relates to terephthalic acid esters. More particularly the invention concerns a method for purifying impure diesters of a lower alkanol and terephthalic acid. Even more particularly the invention relates to a method for obtaining a highly purified dimethylterephthalate suitable for use in the production of film and fiber-forming linear superpolyesters which is essentially free of contaminants which impart undesirable properties to the polyesters or interfere in the production thereof.

Linear superpolyesters of the "Dacron" type have recently become of significant commercial interest. They are produced by polymerizing the reaction product of a dihydric alcohol such as ethylene glycol with dialkyl esters of terephthalic acids, for example dimethylterephthalate, or with mixtures of phthalic acid esters such as dimethylterephthalate and dimethylisophthalate. It is highly desirable that the polyester product be free of any substantial discoloration. This, in turn, requires the use of a dimethylterephthalate starting material which is itself substantially free of impurities which contribute to the discoloration of the polyester. Furthermore, it is highly desirable that the starting material be substantially free of mono-functional impurities which interfere in the polymerization step of the polyester process causing chain-stopping which inhibits the formation of the desirable high molecular weight polyesters.

Dimethylterephthalate, "DMT," is obtained commercially by the esterification of terephthalic acid, "TA," which, in turn, is derived from the catalytic liquid phase oxidation of para-dialkyl substituted benzene, for example paraxylene. In this oxidation process minute amounts of connate impurities are formed which are difficult to separate from the terephthalic acid. Some of these impurities such as 4-carboxy benzaldehyde or p-toluic acid may result from the incomplete oxidation of the paraxylene. Other impurities may be derived from the oxidation of impurities in the paraxylene feed, for example, benzoic acid from toluene and orthophthalic acid from orthoxylene. In addition, there may be minute amounts of impurities which are as yet unidentified but which are thought to be complex compounds such as dimers and trimers of oxidation intermediates.

When the terephthalic acid is esterified these connate impurities are carried over into the esterification reaction and appear in the dimethylterephthalate either in their original acidic form or in the form of methyl esters derivatives thereof. Thus, the hereinbefore mentioned 4-carboxy benzaldehyde may appear as p-formyl methylbenzoate and the p-toluic acid impurity in the TA may appear as p-methyl toluate impurity in the DMT and so forth. In addition to the impurities which are connate to the TA the DMT may also contain another type of impurity such as mono-methyl terephthalate which results from the incomplete esterification of the TA.

The total amount of the impurities hereinbefore described is small—the "crude" DMT may have a purity approaching 98–99 mol percent. Accordingly, it will be understood by those skilled in the art that the term "crude" describing the DMT containing these impurities is used only in a relative sense to indicate the extremely stringent purity requirements imposed by the polyester process; ordinarily a commercially available material having such a small amount of contaminants would be considered to be quite pure.

In commercial practice it is common to purify the "crude" DMT by vacuum distillation. Impurity rich forecut and bottoms fractions are rejected and a heartcut of highly refined ester is obtained in about 75–80% yield which has a purity of about 99.9 mol percent. This heartcut product is extraordinarily pure by common industrial standards but even this uncommonly pure material contains harmful quantities of the aforementioned impurities which it was not possible to remove by the methods suggested in the prior art.

We have now discovered a method of purifying dimethylterephthalate and other lower alkanol diesters of terephthalic acid whereby the concentration of each impurity in the purified product is reduced to below the limit of detectability (0.0002 mol percent by gas chromatographic analysis). Based upon the impurities identified in the crude material this corresponds to a product purity of at least 99.99 mol percent. This highly purified material is a very desirable starting material for the production of film- and fiber-forming linear superpolyesters as hereinbefore described.

In the practice of our invention we treat the crude ester in the liquid state with a dialkyl phosphite in the presence of an alkyl peroxide. Both treating agents are utilized in amounts effective to increase the solubility of the impurities in the liquid phase. The purified product is then crystallized from the liquid treating mixture, leaving the impurities and the treating agents dissolved in the liquid phase.

By the method of our invention we can obtain the highly purified product hereinbefore described directly from the crude material obtained from the esterification step omitting the distillation of the crude ester. It is a surprising feature of our invention that the yield of purified product ester from crude is greatly increased over that obtained by the previously known purification methods. For example, we can obtain the 99.99% pure DMT product in a yield of over 97% by our method.

The mechanism by which our purification method proceeds, in particular the mechanism of the treating step, has not as yet been definitively investigated. For instance, we do not know whether the phosphite and the peroxide actually enter into chemical reaction with the impurities or whether the mechanism is essentially catalytic in nature. Accordingly, the term "treating" has been applied to this step.

While we do not wish to be bound by this mechanism, we believe that the treating step results in the phosphonation of the impurities. The impurities which originally were difficult to separate from the product ester by crystallization because of similar solubilities in the liquid phase are, in their treated form, much more soluble than the product and remain in solution when the product is crystallized therefrom.

It is very surprising that the treating mechanism proceeds selectively, affecting the impurities but leaving the product unchanged. Thus, for example, dialkyl terephthalates are unaffected while other substituted benzenes having a single alkyl carboxylate substituent and a hydrogen, alkyl or formyl group in the para position or a second alkyl carboxylate group in the ortho position are affected.

It is an important feature of our invention that the product ester is essentially free of the treating agents. It is a particularly desirable and important feature of our method that the product ester is essentially free of phosphorous or phosphorous containing compounds as these contaminants will interfere in the subsequent steps in the polyester process causing discoloration of the polyester and lengthening the time required in the polymerization step.

The treating step is suitably performed in the liquid state. For example, the crude ester to be treated may be dissolved in a suitable solvent such as an alcohol. We have found it advantageous to use the alcohol from which the ester is derived. For example, in the treatment of DMT, we use methanol as a solvent. However, it will be appreciated that any solvent is suitable which will dissolve a substantial amount of the crude ester and which will retain the impurities and treating agents in solution when the purified product is crystallized out. Thus, for example, DMT may be treated in ethanol solution. It is another surprising feature of our invention that there is apparently no reaction between the treating agents and the solvent which, if it occurred, would probably result in the destruction of the treating agents before the impurities had been treated.

Alternatively the treating step may be carried out in a melt of the crude ester. For example, DMT may be treated at temperatures above its melting point (140.6° C.), for example, a temperature between 150° and 200° C. is suitable. The treated melt then dissolved in a suitable solvent as hereinabove described whereby the impurities are solubilized and the purified product can be fractionally crystallized therefrom. In still another mode of operation of the invention the solvent is omitted, the crude ester is treated in melt form and the purified ester is then fractionally crystallized from its own melt by well-known zone refining techniques leaving impurities and reagents solubilized in the liquid phase which is discarded. For example, DMT can be treated for about 1–4 hours at 150–200° C. with the above described dialkyl phosphite and alkyl peroxide treating agents and then poured, in molten form, into a zone refining tube where it is cooled until solidification occurs. A heater which encircles the tube and extends along the longitudinal axis thereof for a short distance is then moved from one end of the tube towards the other end. Inside the tube a zone of melted DMT is produced which moves with the heater from one end of the tube to the other. As the melt zone moves the treated impurities are solubilized and accumulated in the melt zone and the DMT which resolidifies behind the heater is purified. This procedure can be repeated as many times as necessary to concentrate the impurities in a relatively small portion of the DMT at one end of the tube, which portion is then discarded.

The amount of dialkyl phosphite treating agent required as an effective amount to achieve essentially complete purification is generally dependent on the amount of impurities in the crude ester. Thus, a highly impure crude indicates the use of a larger amount of phosphite than does a less impure crude. Generally, we have found that in purifying crude esters produced commercially by the hereinbefore described esterification process, it is desirable to use from 0.025 to 0.35 mols of dialkyl phosphite per mol of crude ester. Less than this amount will effect some purification and an excess is not harmful. The role of the peroxide is believed to be that of an initiator for the phosphonation of the impurities. Accordingly, and according to our experience, the amount of peroxide required as an effective amount is generally dependent upon the amount of phosphite employed, e.g., use of a larger amount of phosphite calls for the use of a correspondingly larger amount of peroxide. We prefer to use about 0.25 to 2.5 mols of alkyl peroxide per mol of dialkyl phosphite. The use of smaller amounts of peroxide lengthens the time required for the treating step and the use of larger amounts does not result in an appreciably shorter time.

The dialkyl phosphites which are effective in the practice of our invention include diethyl, dipropyl, diisopropyl, dibutyl, diisobutyl phosphites and the like. The alkyl peroxides which are effective in the practice of our invention include t-butyl, n-butyl, n-propyl, i-propyl, n-hexyl peroxides and the like. It will be appreciated that other suitable phosphites and peroxides could be employed without departing from the spirit and scope of our invention.

We prefer to carry out the treating step at elevated temperatures, suitably under autogenous pressure. Advantageously we employ temperatures in excess of 100° C. in order to achieve an acceptable production rate. In general, higher temperatures result in shorter treating periods. Of course, the upper temperature would in no event be higher than that at which the product would be thermally degraded. We believe that the length of the treating period is dependent to some extent on the degree of dissociation of the peroxide. Thus, if a peroxide is employed which is properly dissociated at a lower temperature, the treating temperature can be reduced without requiring a correspondingly lengthened treating period. The selection of an advantageous treating temperature will then depend on and be a compomise between several factors, e.g., desired production rate, temperature stability of the crude ester, degree of dissociation of the peroxide and so forth. For example, we have found it desirable to treat most crude esters for from about ¼ to 4 hours at a temperature of from 100–300° C. Thus, at about 180° C. the treating of a moderately impure crude dimethylterephthalate with diethyl phosphite and t-butyl peroxide is suitably carried out for about 2 hours, although shorter treating times give some beneficial results and somewhat longer times are not harmful.

After the completion of the treating step the treating mixture is cooled to crystallize out the purified product. For example, a solution of DMT in methanol is cooled to between about 10–25° C. whereby a purified product DMT crystallizes out leaving the impurities and treating agents in the methanolic mother liquor. (Solubility of DMT in methanol=0.47 g./100 g. solvent at 10° C.) The crystals are then separated from the mother liquor, conveniently by filtration, decantation, centrifugation or the like. If desired the separated crystals can be given a final washing with fresh solvent to remove the last traces of the mother liquor containing the impurities.

We offer the following specific example as an illustration of the practice of one mode of operation of our invention.

100 g. (0.515 mol) of crude dimethylterephthalate was dissolved in 128 g. methanol and charged to a reactor along with 26.1 g. (0.189 mol) diethyl phosphite and 3.9 g. (0.026 mol) tert-butyl peroxide. The reactor contents were heated at 180–190° C. for 2 hours under autogenous pressure. The treating mixture was removed from the reactor and a small amount of hot methanol was added to replace that which flashed off during the removal. The treating mixture was then cooled to 20° C. whereupon 97.5 g. of purified dimethylterephthalate crystallized therefrom and was separated from the mother liquor by filtration followed by a washing with cool methanol. In the following table is a comparison of the impurities contents of the crude and purified product.

*Table I*

| Impurity | Mol percent in—[1] | |
|---|---|---|
| | Crude | Purified Product |
| Methyl benzoate | 0.0012 | ≦0.0002 |
| Methyl toluate | .0069 | ≦0.0002 |
| p-formyl methyl benzoate | 1.03 | ≦0.0002 |
| Dimethylorthophthalate | .0044 | ≦0.0002 |
| Unknowns | .015 | ≦0.0002 |
| Totals | 1.0575 | ≦0.0010 |

[1] By gas chromatographic analysis.

The crude ester before purification was tan colored and had a melting point of 139–142° C. The purified product was pure white, had a melting point of 140–141° C. (M.P. pure=140.6° C.) and contained less than the detectable (10 p.p.m.) concentration of phosphorous or phosphorous-containing compounds.

From the foregoing description and illustration it is apparent that we have discovered a very effective and convenient method of obtaining lower alkanol esters of terephthalic acid in extremely high purity which are highly desirable for use as starting materials in the production of high quality polyesters.

Having fully described our invention, we claim:

1. The method of purifying a lower alkanol diester of terephthalic acid, which diester is contaminated with impurities which include impurities connate to said terephthalic acid and derivatives of said connate impurities, which purification method comprises: (a) reacting the contaminated diester at a temperature in the range of from 150 to 200° C. with both dialkyl phosphite and alkyl peroxide; and (b) separating from the treating mixture a highly purified terephthalic acid diester product by dissolving said mixture in a liquid phase of a lower alkanol and crystallizing said product therefrom by cooling.

2. A process which comprises contacting a solution of a lower alkanol and a lower alkanol diester of terephthalic acid which ester is contaminated with impurities connate to said terephthalic acid and derivatives of said connate impurities in the liquid phase at a temperature in the range of 100–300° C. but below the thermal decomposition temperature of said diester with both a di-lower alkyl phosphite and a lower alkyl peroxide, cooling said solution and precipitating diester product, and separating therefrom said precipitated diester product, said purified product being substantially free of phosphorus.

3. The process of claim 2 wherein the amount of said phosphite is from about 0.025 to about 0.35 mols of dialkyl phosphite per mol of said diester.

4. The process of claim 2 wherein the amount of said peroxide is from about 0.25 to about 2.5 mols per mol of said phosphite.

5. The process of claim 2 wherein said phosphite is diethyl phosphite.

6. The process of claim 2 wherein said peroxide is tertiarybutyl peroxide.

References Cited by the Examiner

UNITED STATES PATENTS

| | | | |
|---|---|---|---|
| 2,083,856 | 6/37 | Moravec et al. | 260—702 |
| 2,612,515 | 9/52 | Hudson | 260—475 |
| 2,828,330 | 3/58 | Sinn | 260—475 |
| 2,867,651 | 1/59 | Wise | 260—475 |
| 3,076,018 | 1/63 | Meyer et al. | 260—475 |

LORRAINE A. WEINBERGER, *Primary Examiner.*

DUVAL McCLUTCHEN, LEON ZITVER, *Examiners.*